US 6,535,808 B1

(12) United States Patent
Zumberge

(10) Patent No.: US 6,535,808 B1
(45) Date of Patent: Mar. 18, 2003

(54) DECELERATION CONTROL FOR AUTOMATIC AUTOMOTIVE SPEED CONTROL APPARATUS

(75) Inventor: Jon Tomas Zumberge, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/025,827

(22) Filed: Dec. 19, 2001

(51) Int. Cl.[7] .............................. B60T 7/12; G06F 17/00
(52) U.S. Cl. ............................................. 701/73; 701/70
(58) Field of Search ................................. 701/93, 96, 70; 188/137, 138; 303/121

(56) References Cited

U.S. PATENT DOCUMENTS

| | | | | |
|---|---|---|---|---|
| 6,233,516 B1 | * | 5/2001 | Egawa | 701/96 |
| 6,295,500 B1 | * | 9/2001 | Cullen et al. | 701/93 |
| 6,330,507 B1 | * | 12/2001 | Adachi et al. | 701/93 |
| 6,473,686 B2 | * | 10/2002 | Adachi et al. | 701/96 |

* cited by examiner

Primary Examiner—Richard M. Camby
(74) Attorney, Agent, or Firm—Robert M. Sigler

(57) ABSTRACT

A deceleration control for automotive vehicle speed control apparatus includes first and second memories storing values of closed and open loop deceleration commands, respectively, as functions of the desired vehicle deceleration rate signal. During commanded vehicle deceleration, closed loop brake command signals, derived from values of the closed loop deceleration command in the first memory, are provided to the vehicle braking system while the determined vehicle speed exceeds a transition threshold value; and, alternatively, open loop brake command signals derived from values of the open loop deceleration command in the second memory are provided to the vehicle braking system while the determined vehicle speed does not exceed the transition threshold value. The values in the first memory means are updated on the basis of deceleration error while the determined vehicle speed exceeds the transition threshold value. The values in the second memory means are updated on the basis of an error between the open loop brake command signal and the closed loop brake command signal while the determined vehicle speed exceeds the transition threshold value and are updated with a gain factor greater than that used in updating the values in the first memory means, so that the values in the second memory means conform to those in the first memory means.

6 Claims, 4 Drawing Sheets

DECELERATION CONTROL FOR AUTOMATIC AUTOMOTIVE SPEED CONTROL APPARATUS

TECHNICAL FIELD

The technical field of this invention is automatic speed control for an automotive vehicle.

BACKGROUND OF THE INVENTION

Automatic speed controls for automotive vehicles are being proposed that extend the range of control past the mere maintenance of a preset highway cruising speed. Some such controls are being designed to control vehicle deceleration to a full stop. But a problem that such controls must surmount is that of increasing noise in the vehicle deceleration signal as vehicle speed decreases. This is due to the facts that (1) vehicle deceleration is generally obtained by differentiating a vehicle speed signal and (2) most practical vehicle speed sensors depend on pulse generation by rotating wheels or drive-line components. The time between the generation of successive pulses increases non-linearly as rotational speed decreases and permits an increase in the signal to noise ratio of the vehicle speed signal, which is accentuated in the vehicle deceleration signal.

SUMMARY OF THE INVENTION

This invention is a deceleration control for automotive vehicle speed control apparatus that generates an actual vehicle deceleration rate signal, provides a desired vehicle deceleration rate signal and determines vehicle speed. It includes a first memory storing values of a closed loop deceleration command as a function of the desired vehicle deceleration rate signal and a second memory storing values of an open loop deceleration command as a function of the desired vehicle deceleration signal. It further includes a control that provides a braking command to a vehicle braking system during commanded vehicle deceleration. When the determined vehicle speed exceeds a transition threshold value, the vehicle braking command comprises a closed loop vehicle brake command derived from values of the closed loop deceleration command in the first memory. Alternatively, when the determined vehicle speed does not exceed the transition threshold value, the vehicle braking command comprises an open loop brake command signal derived from values of the open loop deceleration command in the second memory.

While the determined vehicle speed exceeds the transition threshold value, the control updates selected values the first memory means to reduce an error between the actual vehicle deceleration signal and the desired vehicle deceleration signal and further preferably updates selected values in the second memory means to reduce an error between the open loop brake command signal and the closed loop brake command signal. The selected values in the second memory means are updated with a gain factor greater than that used in updating the selected values in the first memory means, so that the selected values in the second memory means conform to those in the first memory means. Thus, automatic open loop operation is provided at low vehicle speeds where vehicle deceleration signals are noisy; and a smooth transition is provided between closed loop and open loop operation as the vehicle decelerates.

DESCRIPTION OF THE PREFERRED EMBODIMENT

Figure 1:
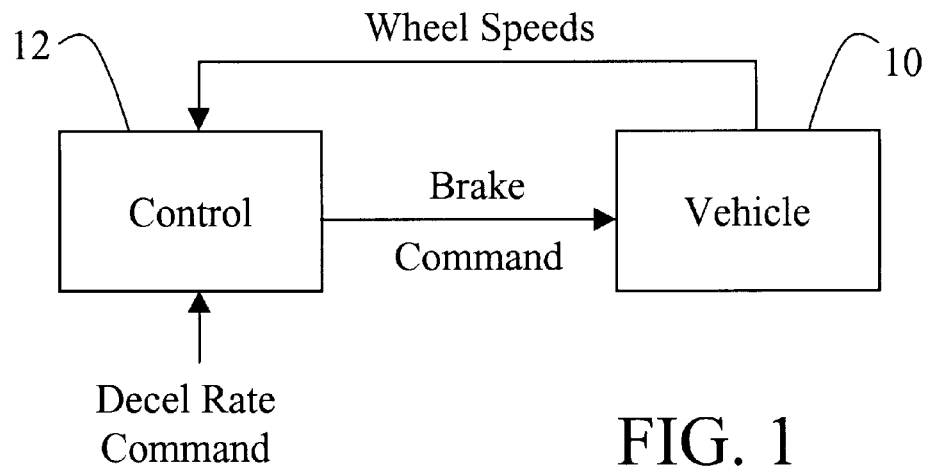
FIG. 1 is a block diagram of an automotive vehicle with an automatic speed control having a deceleration control according to this invention.

Referring to FIG. 1, an automotive vehicle 10 is provided with a set of wheels, a prime mover and a braking system including a brake for each of the wheels and a brake controller to control brake actuation in the normal manner. The vehicle is equipped with an automatic speed control or "cruise control" that may be set to maintain a constant speed in response to a desired speed signal and an actual vehicle speed signal through control of the vehicle fuel supply and/or braking system. Examples of such apparatus are known in the art and are thus not particularly described herein.

The automatic speed control of the vehicle is further provided with a deceleration control 12, which is provided with wheel speed signals from standard wheel speed sensors associated with the wheels of vehicle 10 and a desired vehicle deceleration rate signal (Decel Rate Command) from the vehicle operator or the automatic speed control that specifies the desired vehicle deceleration rate. Responsive to these signals, deceleration control 12 provides an output brake command signal to the vehicle braking and/or fuel control system to control vehicle deceleration at the commanded rate.

Figure 2:
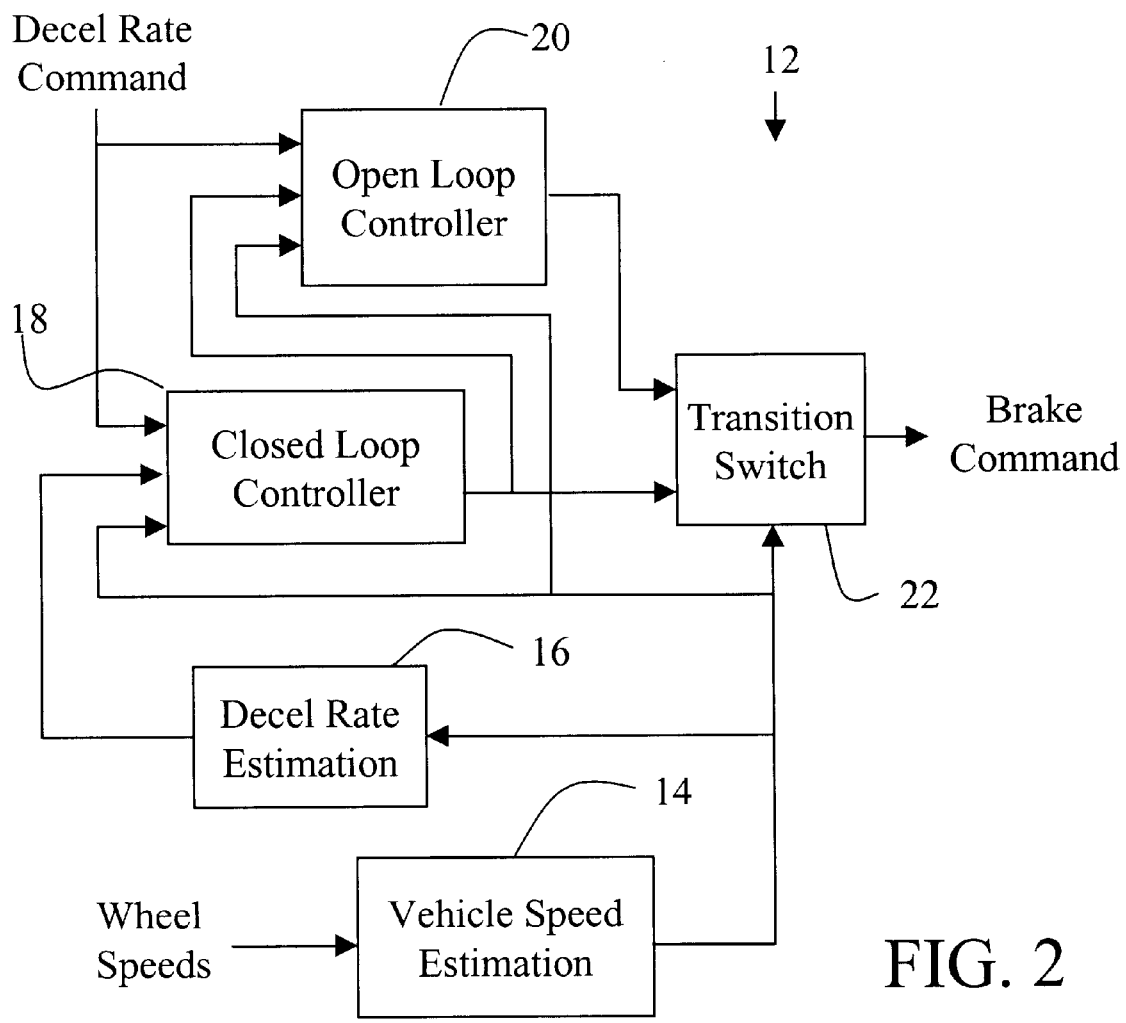
FIG. 2 is a block diagram of a deceleration control according to this invention for use in the automatic speed control of FIG. 1.

FIG. 2 shows control 12 in more detail. A vehicle speed estimation apparatus 14, well known in the art, derives a vehicle speed signal from the received wheel speed signals. A decel rate estimation apparatus 16 derives an actual vehicle deceleration rate signal from the vehicle speed signal in another known manner, for example in a digital differentiation process by repeatedly taking the difference between consecutive values of the vehicle speed signal. A closed loop controller 18 receives a decel rate command signal, an actual decel rate signal from decel rate estimation block 16 and the vehicle speed signal from vehicle speed estimation apparatus 14 and generates a closed loop brake command signal for use in closed loop operation. An open loop controller 20 receives the vehicle speed signal from vehicle speed estimation block 14 and generates an open loop brake command signal for use in open loop operation, as well as receiving a decel rate command signal, the closed loop brake command signal from controller 18, for use in updating. The closed loop and open loop brake command signals from controllers 18 and 20, as well as the vehicle speed signal, are provided to a transition switch 22, wherein only one of the open loop and closed loop brake command signals is passed through as the brake command output signal, as determined by the vehicle speed signal. At vehicle speeds above a predetermined transition threshold value (e.g. 15 kph), wherein the vehicle deceleration signal is sufficiently clean and reliable for good closed loop control, the closed loop brake command signal is passed by transition switch 22; at lower vehicle speeds, the open loop brake command signal is alternatively passed by transition switch 22. As will be described below, adaptive tables in closed loop controller 18 and open loop controller 20 are both updated during closed loop operation to continually compensate the control for physical and environmental changes in the control and braking system and to maintain a smooth transition between closed loop and open loop control.

Figure 3:
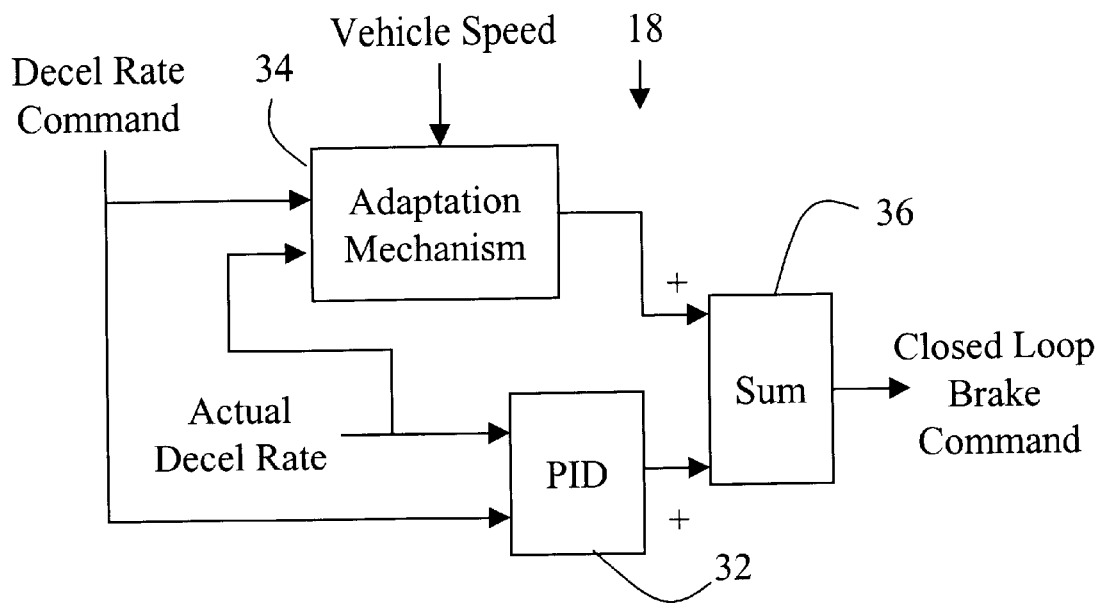
FIG. 3 is a block diagram of a closed loop controller for use in the deceleration control of FIG. 2.

FIG. 3 shows closed loop controller 18 in greater detail. A PID controller 32 receives the decel rate command signal and the Actual Decel Rate signal from decel rate estimation apparatus 16. An adaptation mechanism 34 receives the decel rate command signal, the actual decel rate signal and the vehicle speed signal and provides an output signal that is summed with the output PID command of PID controller 32 in summer 36 to provide the closed loop brake command signal for use in closed loop operation.

Figure 4:
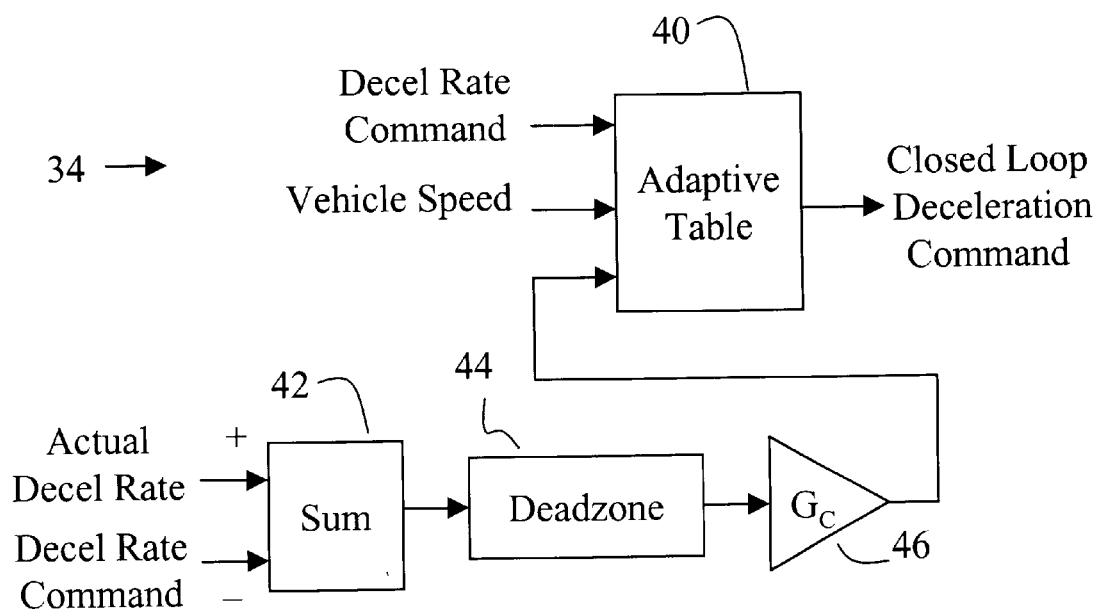
FIG. 4 is a block diagram of an adaptation mechanism for use in the closed loop controller of FIG. 3.
Figure 6:
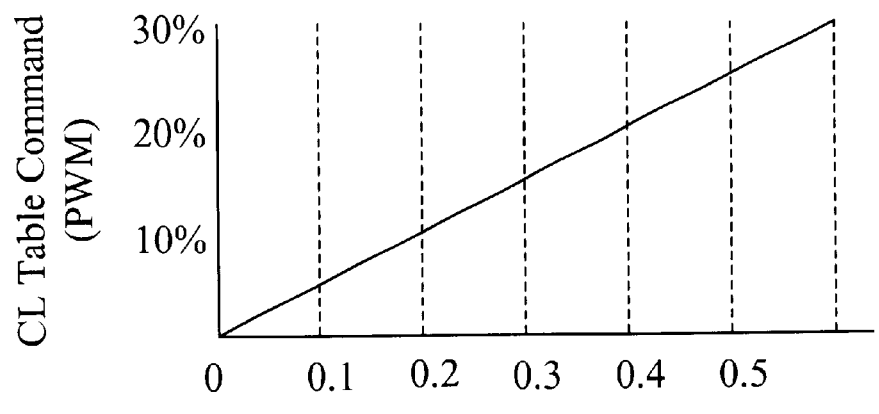
FIGS. 6 and 7 are plots illustrating the operation of the deceleration control of FIG. 2.

FIG. 4 shows details of adaptation mechanism 34. An adaptive table 40 stores values of a closed loop deceleration command (PWM) as a function of discrete values of deceleration (0 g, 0.1 g, 0.2 g . . . etc.), as seen in the plot of FIG. 6. Returning to FIG. 4, the adaptive table 40 receives the decel rate command and vehicle speed signals. Summer 42 derives the difference between the decel rate command signal and the actual decel rate signal from decel rate estimation apparatus 16. The difference between the two signals, decel error, is output from summer 42 to a deadzone block 44, which suppresses values having a magnitude smaller than a predetermined minimum reference value. The signals passing through deadzone block 44 are provided to a gain block 46, which applies a gain $G_c$. The output of gain block 46 is provided as a third input to adaptive table 40.

Figure 7:
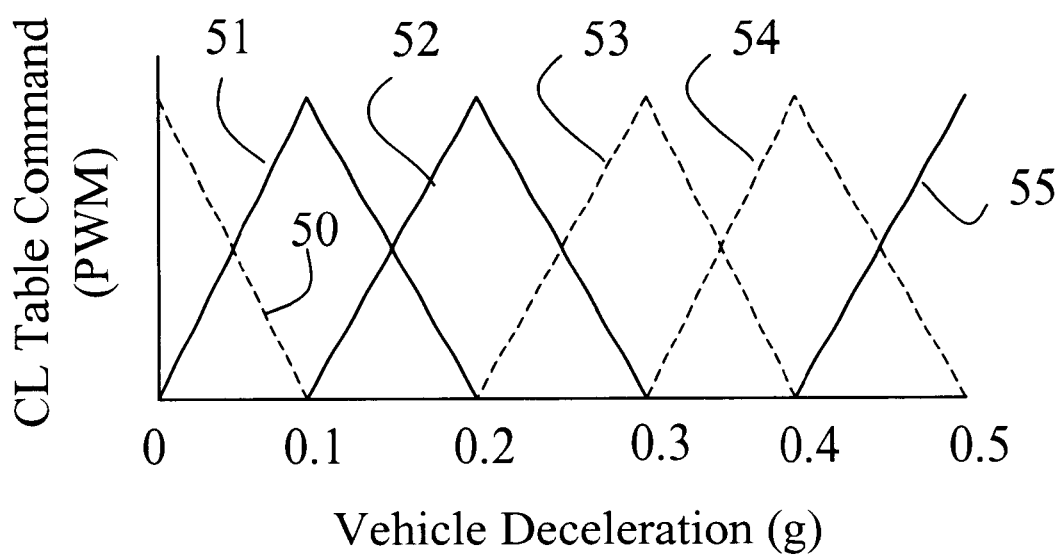

Selected PWM values in adaptive table 40 corresponding to input values of the decel rate command are repeatedly updated during closed loop operation to compensate for changes in the apparatus and/or environment in a process that is described with reference to FIGS. 4, 6 and 7. The process defines a plurality of membership functions for the table, identified as membership functions 50–55 of FIG. 7. For example, membership function 51 is shown by the solid line extending between vehicle deceleration values 0 and 0.2 and belongs to the input value 0.1; while membership function 52 is shown by the solid line extending between deceleration values 0.1 and 0.3 and belongs to the input value 0.2. Membership function 50 is shown by the dashed line extending between vehicle deceleration values 0 and 0.1 and belongs to the input value 0. Membership functions 53–55 are defined in a similar manner. It can be seen that any point on the two dimensional plot has membership in two overlapping membership functions, each of which is associated with a discrete value of vehicle deceleration on each side of its horizontal axis component. In the update process, an input decel rate command that produces a decel error output from summer 42 that is not suppressed by deadzone block 44 will produce a correction factor whose magnitude is determined by the size of the decel error and gain $G_c$. Since only discrete input values are stored in the table, this correction factor is apportioned between the discrete input values on each side of the actual input, on the basis of the membership functions. For example, assume that the input decel rate command is 0.16 g and produces a decel error from summer 42 that is positive and greater than the deadzone reference of block 44. With an input value 0.16 g, which is 60% of the way between discrete values 0.1 g and 0.2 g, the correction factor has 60% membership in membership function 52, belonging to discrete value 0.2 g, and 40% membership in membership function 51, belonging to discrete value 0.1 g. Thus, the correction value is apportioned 40% to the table value corresponding to input value 0.1 and 60% to the table value corresponding to the input value 0.2. The result is essentially a reverse interpolation process in which the table is updated accurately for interpolated values between the table values.

Figure 5:
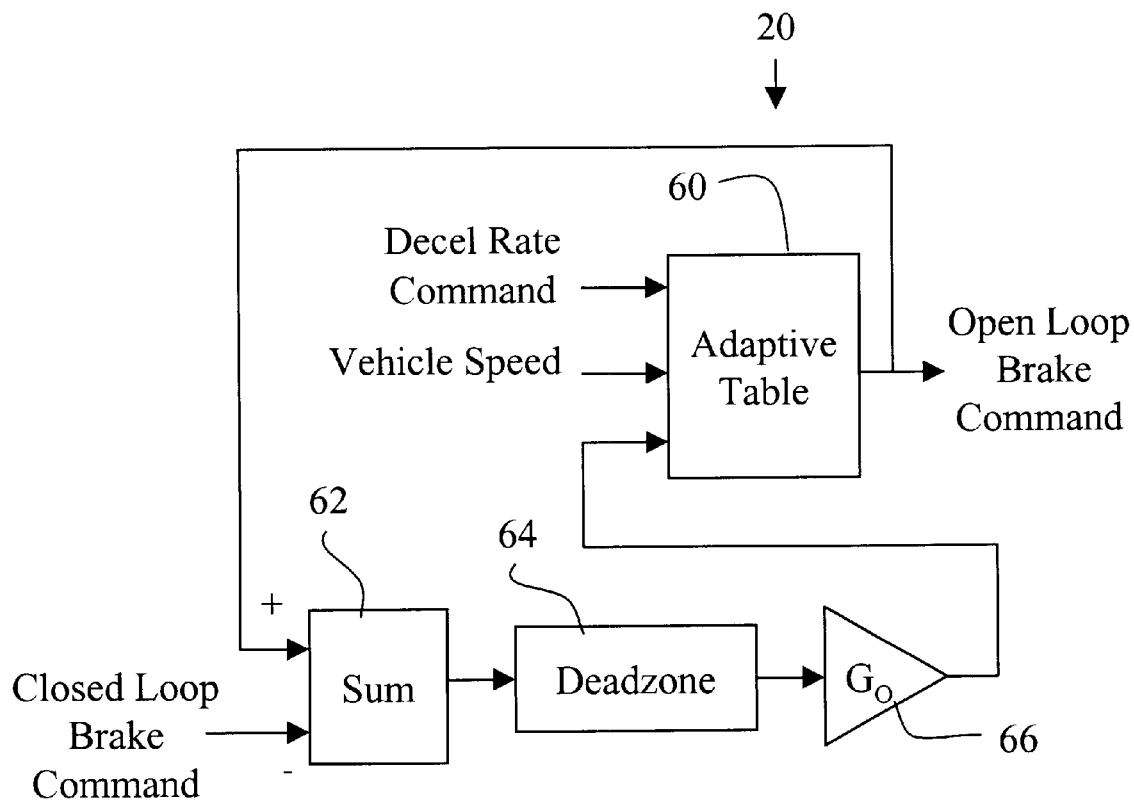
FIG. 5 is a block diagram of an open loop controller for use in the deceleration control of FIG. 2.

FIG. 5 shows open loop control apparatus including an adaptive table 60. Adaptive table 60 receives the vehicle speed signal which determines whether it will be operated in open loop or closed loop mode. In open loop mode, the table is not updated; and an input value of the decel rate command produces an interpolated table output open loop deceleration command that is passed by transition switch 22 to the vehicle braking system as the open loop brake command signal.

Selected values of adaptive table 60 of the open loop control apparatus are updated during closed loop operation of the system. During closed loop operation, the open loop brake command signal, which is the output open loop deceleration command from the table, is provided to a positive input of a summer 62 that receives the closed loop brake command signal from adaptive table 40 on a negative input. The output of summer 62, which represents the difference between the closed loop and open loop brake command signals, is provided to a deadzone block 64 that operates similarly to deadzone block 44 of FIG. 4; the output of deadzone block 64 is provided to a gain block 66 having an open loop gain $G_o$. The output of gain block 66 is provided to adaptive table 60. Adaptive table 60 is updated in a manner similar to that already described for adaptive table 40. Both tables are updated during closed loop operation, when the required feedback is available; and neither table is updated during open loop operation. Thus the phrases "open loop gain" and "closed loop gain" do not refer to control loop gains during closed loop and open loop operation; these phrases refer to gains used in updating closed loop and open loop tables during closed loop operation only. The open loop gain is set higher than the closed loop gain so that the open loop table values can be changed more quickly; and the open loop table values therefore conform to the closed loop table values during closed loop operation. This provides for smooth switches from the closed loop table to the open loop table as the speed of the decelerating vehicle falls below the transition reference speed.

What is claimed is:

1. A deceleration control for automotive vehicle speed control apparatus comprising:

means for generating an actual vehicle deceleration rate signal;

means for providing a desired vehicle deceleration rate signal;

means for determining a vehicle speed;

a first memory storing values of a closed loop deceleration command as a function of the desired vehicle deceleration rate signal;

a second memory storing values of an open loop deceleration command as a function of the desired vehicle deceleration signal;

control means for providing a braking command to a vehicle braking system during commanded vehicle deceleration, the vehicle braking command comprising, while the determined vehicle speed exceeds a transition threshold value, a closed loop brake command signal derived from values of the closed loop deceleration command in the first memory and alternatively comprising, while the determined vehicle speed does not exceed the transition threshold value, an open loop brake command signal derived from values of the open loop deceleration command in the second memory;

the control means updating selected values of the closed loop deceleration command in the first memory means to reduce an error between the actual vehicle deceleration signal and the desired vehicle deceleration signal while the determined vehicle speed exceeds the transition threshold value; and the control means updating selected values of the open loop deceleration command in the second memory means to conform to the selected values of the closed loop deceleration command while the determined vehicle speed exceeds the transition threshold value.

2. The deceleration control of claim 1 wherein the control updates the selected values of the closed loop deceleration command to reduce an error between the open loop brake command signal and the closed loop brake command signal and the selected values of the open loop deceleration command are updated with a gain factor greater than that used in updating the selected values of the closed loop deceleration command.

3. A method of controlling deceleration of an automotive vehicle comprising the steps:

generating an actual vehicle deceleration rate signal;

providing a desired vehicle deceleration rate signal;

determining a vehicle speed;

storing values of a closed loop deceleration command as a function of the desired vehicle deceleration rate signal;

storing values of an open loop deceleration command as a function of the desired vehicle deceleration signal;

providing a braking command to a vehicle braking system during commanded vehicle deceleration, the vehicle braking command comprising, while the determined vehicle speed exceeds a transition threshold value, a closed loop brake command signal derived from the values of the closed loop deceleration command and alternatively comprising, while the determined vehicle speed does not exceed the transition threshold value, an open loop brake command signal derived from the values of the open loop deceleration command;

updating selected values of the closed loop deceleration command signal to reduce an error between the actual vehicle deceleration signal and the desired vehicle deceleration signal while the determined vehicle speed exceeds the transition threshold value; and updating selected values of the open loop deceleration command signal to conform to the selected values of the closed loop deceleration command signal while the determined vehicle speed exceeds the transition threshold value.

4. The method of claim 3 wherein the selected values of the open loop deceleration command signal are updated to reduce an error between the open loop brake command signal and the closed loop brake command signal and are also updated with a gain factor greater than that used in updating the selected values of the closed loop deceleration commands.

5. The method of claim 3 wherein values of the closed loop deceleration signal are stored in a table corresponding to discrete table reference values, the method further comprising the step:

defining a plurality of membership functions, one such membership function corresponding to each of the discrete table reference values, so that each value of the desired vehicle deceleration rate signal possesses a degree of membership in each of two of the membership functions corresponding to adjacent discrete table reference values, the step of updating selected values of the closed loop deceleration command signal further comprising updating, for a provided value of the desired vehicle deceleration rate between two adjacent discrete table reference values, each of the two adjacent discrete table reference values according to the degree of membership of the provided value of the desired vehicle deceleration rate in the corresponding membership function.

6. The method of claim 3 wherein values of the open loop deceleration signal are stored in a table corresponding to discrete table reference values, the method further comprising the step:

defining a plurality of membership functions, one such membership function belonging to each of the discrete table reference values, so that each value of the desired vehicle deceleration rate signal possesses a degree of membership in each of two of the membership functions corresponding to adjacent discrete table reference values, the step of updating selected values of the closed loop deceleration command signal further comprising updating, for a provided value of the desired vehicle deceleration rate between two adjacent discrete table reference values, each of the two adjacent discrete table reference values according to the degree of membership of the provided value of the desired vehicle deceleration rate in the corresponding membership function.

\* \* \* \* \*